US011273404B2

(12) United States Patent
Takeno et al.

(10) Patent No.: US 11,273,404 B2
(45) Date of Patent: Mar. 15, 2022

(54) POROUS COMPOSITE

(71) Applicant: NGK INSULATORS, LTD., Nagoya (JP)

(72) Inventors: Shogo Takeno, Nagoya (JP); Kousuke Ujihara, Nagoya (JP); Yunie Izumi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/092,429

(22) Filed: Nov. 9, 2020

(65) Prior Publication Data

US 2021/0053005 A1    Feb. 25, 2021

Related U.S. Application Data

(63) Continuation of application No. PCT/JP2018/023445, filed on Jun. 20, 2018.

(51) Int. Cl.
*B01D 46/24* (2006.01)
*F01N 3/022* (2006.01)

(52) U.S. Cl.
CPC ......... *B01D 46/2418* (2013.01); *F01N 3/022* (2013.01); *B01D 46/24491* (2021.08); *B01D 46/24492* (2021.08)

(58) Field of Classification Search
None
See application file for complete search history.

(56) References Cited

U.S. PATENT DOCUMENTS

| 2009/0173065 A1* | 7/2009 | Cho ..................... B01J 35/10 60/299 |
| 2012/0058020 A1* | 3/2012 | Takagi ............... B01D 53/944 422/178 |
| 2012/0240538 A1* | 9/2012 | Isoda ................. B01D 39/2072 55/486 |

(Continued)

FOREIGN PATENT DOCUMENTS

| EP | 2 168 662 A1 | 3/2010 |
| EP | 2 236 188 A1 | 10/2010 |

(Continued)

OTHER PUBLICATIONS

International Search Report and Written Opinion (Application No. PCT/JP2018/023445) dated Aug. 21, 2018.

(Continued)

*Primary Examiner* — Mary I Omori
(74) *Attorney, Agent, or Firm* — Burr & Brown, PLLC (57) ABSTRACT

A porous composite includes a porous base material and a porous collection layer formed on the base material. The collection layer has a thickness greater than or equal to 6 μm. The collection layer has a plurality of large pores, each exposing the surface of the base material. A sum of areas of exposed regions of the base material that are each exposed from each large pore of the plurality of large pores is greater than or equal to 1% of the total area of the collection layer and less than or equal to 30% thereof. This allows the porous composite to achieve a favorable efficiency of collecting particulate matter and to increase the accessible area between the particulate matter and the collection layer and thereby accelerate oxidation of the particulate matter collected by the porous composite.

10 Claims, 5 Drawing Sheets

(56) References Cited

U.S. PATENT DOCUMENTS

2012/0240542 A1    9/2012   Kikuchi
2013/0269528 A1    10/2013  Sappok et al.
2016/0272547 A1    9/2016   Kikuchi et al.

FOREIGN PATENT DOCUMENTS

| EP | 2 275 185 A1 | 1/2011 |
|----|---|---|
| EP | 2 375 021 A1 | 10/2011 |
| JP | 2010-082615 A1 | 4/2010 |
| JP | 2010-095399 A1 | 4/2010 |
| JP | 2014-057951 A1 | 4/2014 |
| JP | 5597084 B2 | 10/2014 |
| JP | 5599747 B2 | 10/2014 |
| JP | 2016-175810 A1 | 10/2016 |
| WO | 2009/133857 A1 | 11/2009 |

OTHER PUBLICATIONS

English translation of the International Preliminary Report on Patentability (Chapter I) (Application No. PCT/JP2018/023445) dated Dec. 30, 2020.

German Office Action (Application No. 11 2018 007 753.5) dated Mar. 4, 2021 (with English translation).

\* cited by examiner

POROUS COMPOSITE

CROSS-REFERENCE TO RELATED APPLICATION

This present application is a continuation application of International Application No. PCT/JP2018/023445, filed on Jun. 20, 2018. The contents of this application are incorporated herein by reference in their entirety.

BACKGROUND OF THE INVENTIOND

Field of the Invention

The present invention relates to a porous composite.

Description of Related Art

Gases exhausted from internal combustion engines such as diesel engines or various combustion apparatuses contain particulate matter such as soot. Hence, vehicles or other equipment that mount diesel engines are provided with filters for collecting particulate matter in exhaust gases. As one of these filters, a honeycomb structure is used in which some of a plurality of cells of a porous honeycomb base material have an opening on their outlet side, and the remaining cells have an opening provided with a mesh sealing part on their inlet side.

In the case of using such a honeycomb structure to collect particulate matter, if the particulate matter infiltrates into the inside of a partition wall of the porous honeycomb base material, pores of the partition wall may be blocked off and pressure loss may increase. In view of this, Japanese Patent Application Laid-Open No. 2014-57951 (Document 1), Japanese Patent No. 5597084 (Document 2), and Japanese Patent No. 5599747 (Document 3) have proposed to provide a porous collection layer on the inner surfaces of cells that each have an opening provided with a mesh sealing part on the outlet side and collect particulate matter by this collection layer in order to suppress infiltration of the particulate matter into the inside of the partition wall.

In the case of the honeycomb structure of Document 1, the collection layer is formed by making a catalyst solution into spray form and spraying the solution as a carrier gas on the honeycomb base material. This may cause the base material to be caked with the collection layer and may increase pressure loss in the honeycomb structure. On the other hand, if the collection layer is made excessively thin in order to reduce pressure loss, the efficiency of collecting particulate matter may deteriorate.

The aforementioned filters mounted on vehicles or other equipment perform regeneration processing for heating and oxidizing particulate matter collected by the filters and removing the particulate matter from the filters in order to prevent excessive accumulation of the particulate matter. In the honeycomb structures of Documents 1 to 3, the collection layers have a catalyst function to accelerate the oxidation of particulate matter that comes in contact with the collection layer.

The honeycomb structures used as the aforementioned filters are currently required to achieve a favorable efficiency of collecting particulate matter and to further accelerate the oxidation of particulate matter.

SUMMARY OF THE INVENTION

The present invention is intended for a porous composite, and it is an object of the present invention to accelerate oxidation of particulate matter while achieving a favorable efficiency of collecting particulate matter.

A porous composite according to a preferable embodiment of the present invention includes a porous base material, and a porous collection layer formed on the base material. The collection layer has a thickness greater than or equal to 6 μm. The collection layer has a plurality of large pores, each exposing a surface of the base material. Aa sum of areas of exposed regions of the base material that are each exposed through each large pore of the plurality of large pores is greater than or equal to 1% of a total area of the collection layer and less than or equal to 50% of the total area of the collection layer. This porous composite can accelerate oxidation of particulate matter while achieving a favorable efficiency of collecting particulate matter.

Preferably, the exposed regions of the base material, each exposed through the each large pore of the plurality of large pores, have perimeters greater than or equal to 18 μm and less than or equal to 500 μm.

Preferably, a rate of increase of an accessible area between the collection layer and particulate matter caused by the plurality of large pores is higher than or equal to 1% and lower than or equal to 75%.

Preferably, among a plurality of enlarged images of a surface of the collection layer that are captured at a plurality of arbitrary positions on the collection layer and magnified 1000 times by an SEM, 90% or more enlarged images include some of the plurality of large pores.

More preferably, the number of large pores included in each of the 90% or more enlarged images is greater than or equal to one and less than or equal to eight.

Preferably, the collection layer has pores with diameters greater than or equal to 3 μm and less than or equal to 20 μm in a region other than the plurality of large pores.

A porous composite according to another preferable embodiment of the present invention includes a porous base material, and a porous collection layer formed on the base material. The collection layer has a thickness greater than or equal to 6 μm. In a photograph of sections of the collection layer and the base material captured and magnified 500 times by an SEM, a plurality of straight lines perpendicular to an interface between the collection layer and the base material are arranged at an equal interval along the interface, and a value obtained by dividing the number of a plurality of overlapping straight lines that overlap with pixels indicating the collection layer by a total number of the plurality of straight lines is greater than or equal to 50% and less than or equal to 90%. This porous composite can accelerate oxidation of particulate matter while achieving a favorable efficiency of collecting particulate matter.

Preferably, a value obtained by dividing the number of overlapping straight lines that overlap with pixels indicating the collection layer by an amount less than or equal to 10% of a thickness of the collection layer, among the plurality of overlapping straight lines, by the total number of the plurality of straight lines is greater than or equal to 30%.

Preferably, the base material has a honeycomb structure whose inside is partitioned into a plurality of cells by a partition wall. At least some of the plurality of cells have inner surfaces covered with the collection layer.

Preferably, the porous composite described above is a gasoline particulate filter that collects particulate matter in an exhaust gas emitted from a gasoline engine.

These and other objects, features, aspects and advantages of the present invention will become more apparent from the following detailed description of the present invention when taken in conjunction with the accompanying drawings.

DETAILED DESCRIPTION OF THE INVENTION

Figure 1:
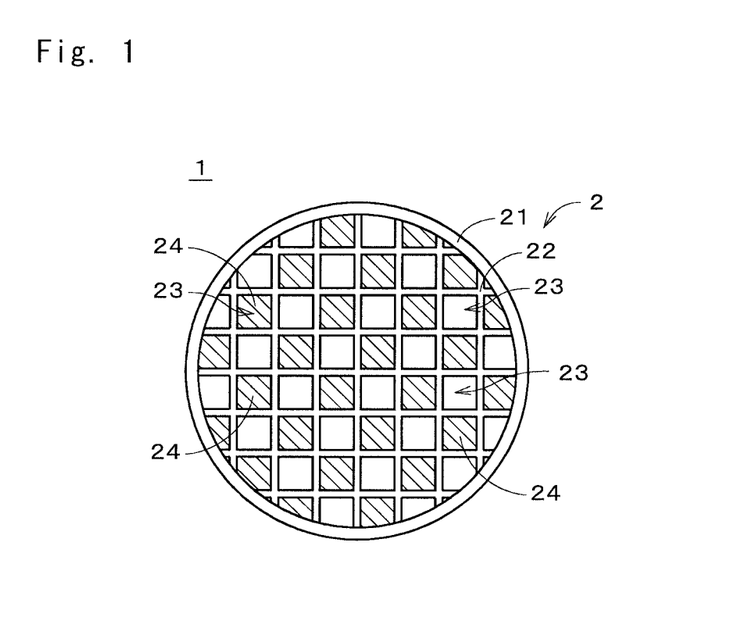
FIG. 1 is a plan view of a porous composite according to one embodiment.
Figure 2:
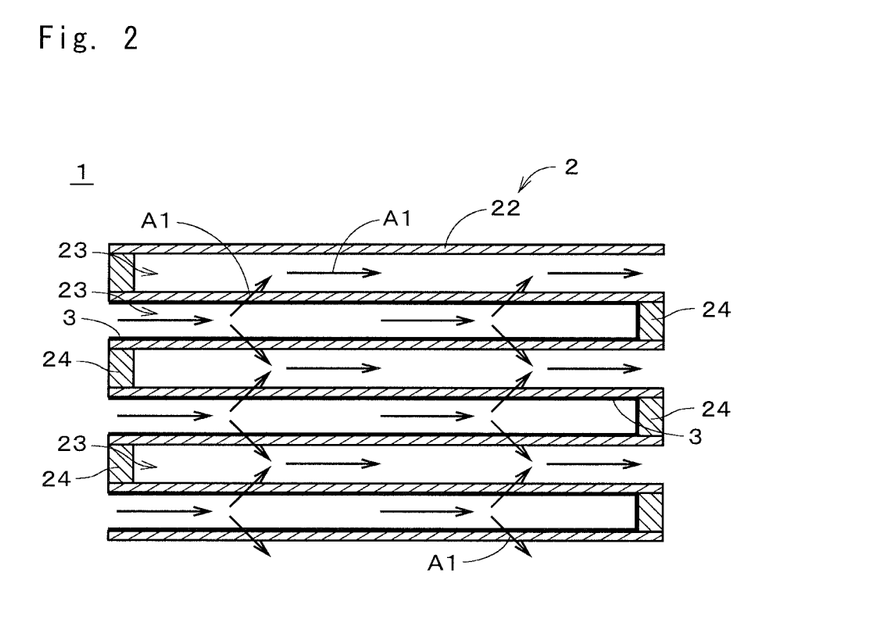
FIG. 2 is a sectional view of the porous composite.

FIG. 1 is a plan view illustrating a porous composite 1 according to one embodiment of the present invention in simplified form. The porous composite 1 is a tubular member that is long in one direction. In FIG. 1, the end face on one side in the longitudinal direction of the porous composite 1 is illustrated. FIG. 2 is a sectional view of the porous composite 1. In FIG. 2, part of a section taken along the longitudinal direction is illustrated. For example, the porous composite 1 is used as a gasoline particulate filter (GPF) for collecting particulate matter such as soot in an exhaust gas emitted from a gasoline engine of a vehicle such as an automobile.

The porous composite 1 includes a porous base material 2 and a porous collection layer 3. In the example illustrated in FIGS. 1 and 2, the base material 2 is a member having a honeycomb structure. The base material 2 includes a tubular outer wall 21 and a partition wall 22. The tubular outer wall 21 is a tubular portion that extends in the longitudinal direction (i.e., the left-right direction in FIG. 2). The tubular outer wall 21 has, for example, a generally circular sectional shape perpendicular to the longitudinal direction. This sectional shape may be any other shape such as a polygonal shape.

The partition wall 22 is a grid-shaped portion that is provided inside the tubular outer wall 21 and partitions the inside into a plurality of cells 23. Each of the cells 23 is a space extending in the longitudinal direction. Each cell 31 has, for example, a generally square sectional shape perpendicular to the longitudinal direction. This sectional shape may be any other shape such as a polygonal shape or a circular shape. These cells 23 have the same sectional shape as a general rule. Alternatively, these cells 23 may include cells 23 that have different sectional shapes. The base material 2 is a cell structure whose inside is partitioned into the cells 23 by the partition wall 22.

The tubular outer wall 21 and the partition wall 22 are both porous portions. The tubular outer wall 21 and the partition wall 22 are formed of, for example, ceramic such as cordierite. The material of the tubular outer wall 21 and the partition wall 22 may be ceramic other than cordierite, or may be a material other than ceramic. The tubular outer wall 21 has a length of, for example, 50 mm to 300 mm in the longitudinal direction. The outside diameter of the tubular outer wall 21 is, for example, in the range of 50 mm to 300 mm. The thickness of the tubular outer wall 21 is, for example, greater than or equal to 30 micrometers (μm) and preferably greater than or equal to 50 μm. The thickness of the tubular outer wall 21 is also, for example, less than or equal to 1000 μm, preferably less than or equal to 500 μm, and more preferably less than or equal to 350 μm.

The length of the partition wall 22 in the longitudinal direction is generally the same as that of the tubular outer wall 21. The thickness of the partition wall 22 is, for example, greater than or equal to 30 μm and preferably greater than or equal to 50 μm. The thickness of the partition wall 22 is also, for example, less than or equal to 1000 μm, preferably less than or equal to 500 μm, and more preferably less than or equal to 350 μm. The porosity of the partition wall 22 is, for example, higher than or equal to 20% and preferably higher than or equal to 30%. The porosity of the partition wall 22 is also, for example, lower than or equal to 80% and preferably lower than or equal to 70%. A mean pore diameter of the partition wall 22 is, for example, greater than or equal to 5 μm and preferably greater than or equal to 8 μm. The mean pore diameter of the partition wall 22 is also, for example, less than or equal to 30 μm and preferably less than or equal to 25 μm.

A cell density of the base material 2 (i.e., the number of cells 23 per unit area of a section perpendicular to the longitudinal direction) is, for example, greater than or equal to 10 cells/cm$^2$ (per square centimeter), preferably greater than or equal to 20 cells/cm$^2$, and more preferably greater than or equal to 30 cells/cm$^2$. The cell density is also, for example, less than or equal to 200 cells/cm$^2$ and preferably less than or equal to 150 cells/cm$^2$. In the illustration in FIG. 1, the sizes of the cells 23 are greater than the actual sizes, and the number of cells 23 is smaller than the actual number. The sizes and number of the cells 23 may be changed in various ways.

In the case where the porous composite 1 is used as a GPF, a gas such as an exhaust gas flows through the inside of the porous composite 1, with one end side of the porous composite 1 in the longitudinal direction (i.e., the left side in FIG. 2) as an inlet and the other end side as an outlet. Some of the cells 23 of the porous composite 1 each have a mesh sealing part 24 at the end on the inlet side, and the remaining cells 23 each have a mesh sealing part 24 at the end on the outlet side.

FIG. 1 is an illustration of the inlet side of the porous composite 1. In FIG. 1, the mesh sealing parts 24 on the inlet side are cross-hatched in order to facilitate understanding of the drawing. In the example illustrated in FIG. 1, the cells 23 that have the mesh sealing parts 24 on the inlet side and the cells 23 that do not have the mesh sealing parts 24 on the inlet side (i.e., the cells 23 that have the mesh sealing parts 24 on the outlet side) are arranged alternatively in both the longitudinal and lateral directions in FIG. 1.

The collection layer 3 is formed in film form on the surface of the base material 2. In the example illustrated in FIG. 2, the collection layer 3 is provided in the cells 23 that have the mesh sealing parts 24 on the outlet side, and covers the inner surfaces of these cells 23 (i.e., the surface of the partition wall 22). In FIG. 2, the collection layer 3 is indicated by bold lines. The collection layer 3 also covers the inner surfaces of the mesh sealing parts 24 on the outlet side of the cells 23. On the other hand, the collection layer 3 does not exist in a plurality of cells 23 that have the mesh sealing parts 24 on the inlet side. For example, the collection layer 3 is formed of ceramic such as silicon carbide (SiC). The collection layer 3 may be formed of ceramic other than SiC (e.g., cerium oxide ($CeO_2$)), or may be formed of a material other than ceramic.

The porosity of the collection layer 3 is, for example, higher than or equal to 60% and preferably higher than or equal to 70%. The porosity of the collection layer 3 is also preferably lower than or equal to 95% and preferably lower than or equal to 90%. The collection layer 3 has a thickness greater than or equal to 6 μm. The thickness of the collection layer 3 is preferably greater than or equal to 8 μm and more preferably greater than or equal to 10 μm. The thickness of the collection layer 3 is also, for example, less than or equal to 100 μm, preferably less than or equal to 70 μm, and more preferably less than or equal to 50 μm.

Figure 3:
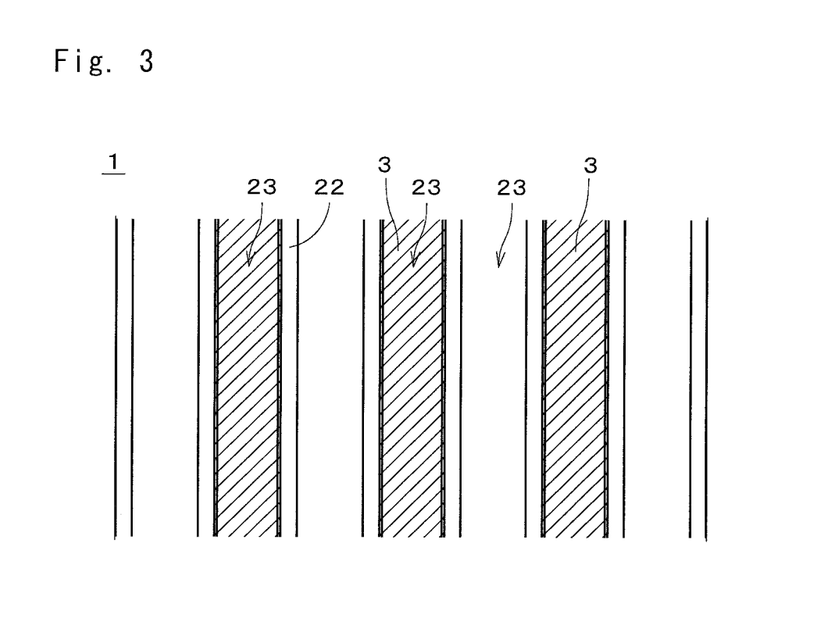
FIG. 3 is a diagram illustrating part of the porous composite that has been cut.

The thickness of the collection layer 3 can be measured by a 3D-shape measuring device. Specifically, the porous composite 1 is first cut at a section parallel to the longitudinal direction and including a plurality of cells 23, and an image of this section is captured by a 3D-shape measuring device (one-shot 3D measuring microscope VR-3200 manufactured by Keyence Corporation). FIG. 3 is a diagram schematically illustrating the image obtained by the 3D-shape measuring device. This image incudes seven cells 23 that are symmetrical with respect to a point and symmetrical with respect to a horizontal line. Among these seven cells 23, the cell 23 in the center and cells 23 that are each the second cell from the cell 23 in the center in the left-right direction are provided with the collection layer 3. In FIG. 3, the collection layer 3 is cross-hatched in order to facilitate understanding of the drawing. In FIG. 3, sections of the collection layer 3 on the partition wall 22 are indicated by thick lines.

Then, five cells 23 among the seven cells 23, excluding the cells 23 at the opposite left and right ends, are subjected to measurement using the aforementioned 3D-shape measuring device so as to obtain an average height in a central portion of each cell 23 in the left-right direction. This central portion measured by the 3D-shape measuring device has a width in the left-right direction that is approximately one third of the width of the cell 23 in the left-right direction. The five cells 23 include three cells 23 provided with the collection layer 3 and two cells 23 that are not provided with the collection layer 3. Then, the thickness of the collection layer 3 is obtained by subtracting an average value of the average heights of the two cells 23 that are not provided with the collection layer 3 from an average value of the average heights of the three cells 23 provided with the collection layer 3.

The thickness of the collection layer 3 is, for example, measured in the central portions of the cells 23 in the longitudinal direction. Alternatively, the thickness of the collection layer 3 may be an average value of thicknesses measured in the central, upper, and lower portions of the cells 23 in the longitudinal direction.

As indicated by arrows A1 in FIG. 2, the gas flowing into the porous composite 1 flows into cells 23 whose inlet sides are not sealed from the inlets of these cells 23, and flows from these cells 23 through the collection layer 3 and the partition wall 22 into cells 23 whose outlet sides are not sealed. At this time, particulate matter in the gas is efficiently collected by the collection layer 3.

Next, one example of the method of producing the porous composite 1 will be described with reference to FIG. 4. In the case of producing the porous composite 1, first the outer surface of the tubular outer wall 21 of the base material 2 is covered with a liquid-impermeable sheet member. For example, a liquid-impermeable film is wrapped around generally the entire outer surface of the tubular outer wall 21.

Then, raw slurry for forming the collection layer 3 is prepared (step S11). The raw slurry is made by mixing, for example, particles as a raw material of the collection layer 3 (hereinafter, referred to as "collection-layer particles"), particles of a pore-forming agent, and a flocculating agent with water. The collection-layer particles are, for example, SiC particles. The raw slurry contains particles (hereinafter, referred to as "flocculated particles") formed by flocculating, for example, the collection-layer particles and the particles of the pore-forming agent. In the case of making the raw slurry, the type and amount of the flocculating agent to be added, for example, are determined such that the particle diameters of the flocculated particles become greater than the mean pore diameter of the base material 2. This prevents or suppresses the flocculated particles from being infiltrated into the pores of the base material 2 in step S12 described later. The viscosity of the raw slurry is, for example, in the range of 2 mPa·s to 30 mPa·s.

Next, the raw slurry is supplied to a plurality of cells 23 on which the collection layer 3 is to be formed, among the cells 23 of the base material 2, from the inlets of these cells 23 (i.e., the ends that do not have the mesh sealing parts 24) (step S12). The water in the raw slurry flows through the partition wall 22 of the base material 2 to adjacent cells 23 and flows out of the base material 2 from the ends of these adjacent cells 23 on the side where the mesh sealing parts 24 are not provided. The flocculated particles in the raw slurry do not pass through the partition wall 22 and adhere to the inner surfaces of the cells 23 to which the raw slurry has been supplied. This forms an intermediate in which the flocculated particles adhere generally uniformly to the inner surfaces of the predetermined cells 23 of the base material 2.

When the supply of a predetermined amount of the raw slurry is completed, the intermediate from which water has run out is dried (step S13). For example, the intermediate is first dried at room temperature for 22 hours and then further dried by being heated at 80° C. for 24 hours. Thereafter, the intermediate is fired so that the collection-layer particles in a large number of flocculated particles adhering to the base material 2 are bonded together and spread to the surface of the base material 2, forming the porous collection layer 3 (step S14). In this firing step, the particles of the pore-forming agent contained in the collection layer 3 are removed by combustion, so that small pores are formed in the collection layer 3.

Figure 5:
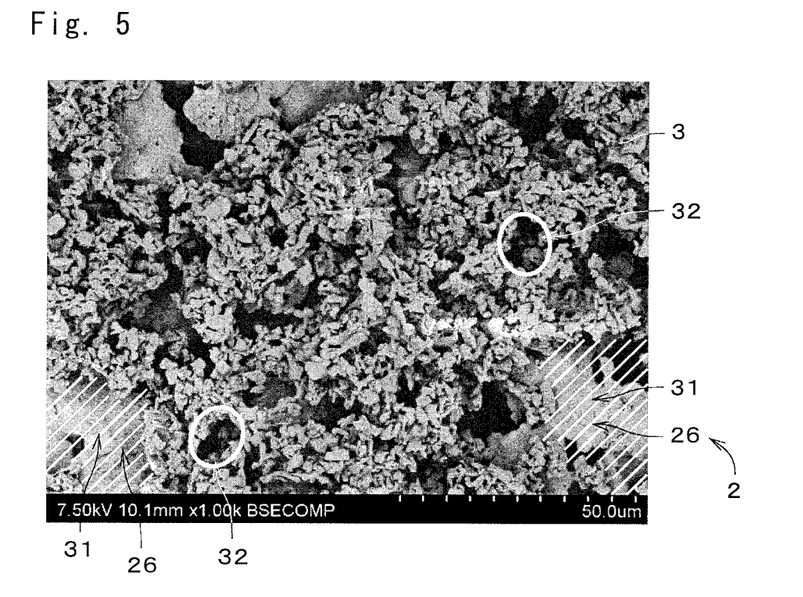
FIG. 5 is an SEM image of a surface of a collection layer.

FIG. 5 is a scanning electron microscope (SEM) image of the inner surface of a cell 23 with the collection layer 3 formed thereon in the porous composite 1. In other words, FIG. 5 is an SEM image of the surface of the collection layer 3. The SEM image in FIG. 5 is an image magnified 1000 times. The collection layer 3 includes a plurality of small pores 32 as indicated by thick lines, which enclose some of the small pores 32 in FIG. 5. As described above, the small pores 32 are pores formed principally by removing particles of the pore-forming agent by combustion. The diameters of the small pores 32 measured in the SEM image are, for example, greater than or equal to 3 μm and less than or equal to 20 μm.

The collection layer 3 also includes a plurality of large pores 31 larger than the small pores 32 as indicated by cross-hatching, which is applied to some of the large pores 31 in FIG. 5. As shown in the SEM image in FIG. 5, the surface of the base material 2 is exposed through each of the large pores 31. The state in which the surface of the base material 2 is exposed refers to a state in which an aggregate of the base material 2 or openings in the surface of the base material 2 are not covered with the collection layer 3 and visually recognizable in the SEM image of the surface of the collection layer 3.

The large pores 31 are regions that have remained without being covered with a plurality of collection-layer particles in the case where the collection-layer particles bind together while spreading over the surface of the base material 2 (i.e., while covering the surface of the base material 2) in the aforementioned firing process in step S14. Note that the large pores 31 differ from non-attaching regions that are formed when a layer of particles adhering to the surface of the base material 2 in step S12 is delaminated from the base material 2 in relatively wide ranges for some reason before the firing process in step S14.

The diameter of each large pore 31 measured in the SEM image is, for example, greater than or equal to 6 μm and less than or equal to 50 μm. The diameter of each large pore 31 refers to the diameter of each exposed region 26 of the base material 2 exposed through the large pore 31. For example, each exposed region 26 has a perimeter greater than or equal to 18 μm and less than or equal to 500 μm. The area of each exposed region 26 is, for example, greater than or equal to 25 μm$^2$ and less than or equal to 2000 μm$^2$. The area of each exposed region 26 refers to the area of a region of the base material 2 that is exposed through each large pore 31 in the case where it is assumed that openings (i.e., pores) in the surface of the base material 2 are filled up.

In the case where a plurality of large pores 31 adjacent to one another in the surface of the base material 2 are connected and regarded as one large pore 31 of the collection layer 3, the exposed region 26 corresponding to this one large pore 31 has a greater diameter, a greater perimeter, and a greater area than those in the above-described ranges. Even in the case where a pore in the collection layer 3 has a greater diameter or other sizes than the large pores 31, if the base material 2 is not exposed through this pore, the pore is not regarded as a large pore 31.

In the porous composite 1, a sum of the areas of the exposed regions 26 that are each exposed through each large pore 31 (i.e., a sum total area of a plurality of exposed regions 26) in each cell 23 with the collection layer 3 formed thereon is greater than or equal to 1% of the total area of the collection layer 3 and less than or equal to 50% thereof. The total area of the collection layer 3 in each cell 23 refers to the area of the entire surface of the collection layer 3 in plan view in the case where it is assumed that a plurality of large pores 31 included in the collection layer 3 are filled up. The sum total area of a plurality of exposed regions 26 in each cell 23 is preferably greater than or equal to 10% of the total area of the collection layer 3, and more preferably greater than or equal to 20% thereof. The sum total area of a plurality of exposed regions 26 in each cell 23 is also preferably less than or equal to 50% of the total area of the collection layer 3, and more preferably less than or equal to 40% thereof.

In the porous composite 1, in the case where the surface of the collection layer 3 is captured at a plurality of arbitrary positions on the collection layer 3 and magnified 1000 times by an SEM, 90% or more enlarged images among a plurality of captured enlarged images include some of the plurality of large pores 31. The areas of fields of view of these enlarged images are in the range of 11000 μm$^2$ to 13000 μm$^2$ and are, for example, 12048 μm$^2$. For example, these enlarged images are acquired by an SEM "S-3400N" manufactured by Hitachi High Technologies, Inc.

The number of large pores 31 included in each of the aforementioned 90% or more enlarge images (i.e., enlarged images including large pores 31) is, for example, greater than or equal to one and less than or equal to eight. In the case of obtaining the number of large pores 31 in each enlarged image, even a large pore 31 that is included only in part in the enlarged image is also counted as one large pore, like the large pores 31 that are included in their entirety in the enlarged image.

Figure 6:
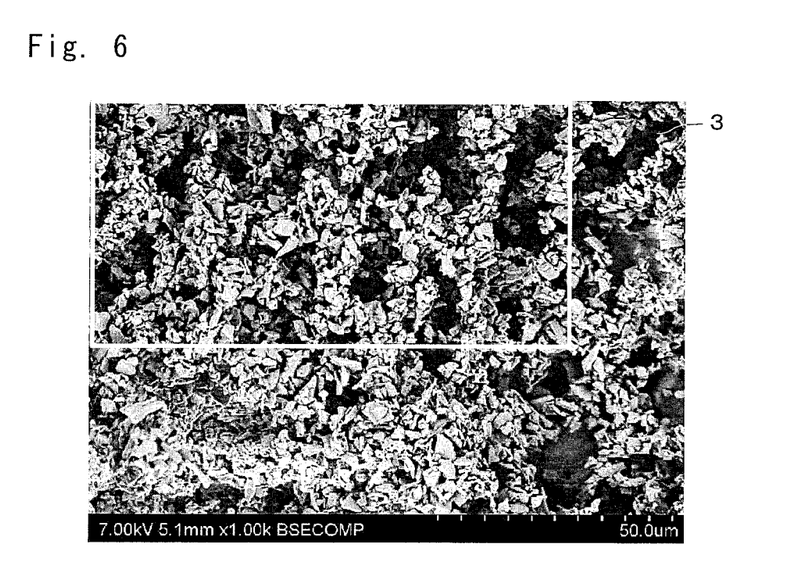
FIG. 6 is an SEM image of the surface of the collection layer.

Next, one example of the method for detecting the small pores 32 in the collection layer 3 will be described. FIG. 6 is an SEM image of the surface of the collection layer 3. The SEM image in FIG. 6 is an image magnified 1000 times. In the case of detecting the small pores 32, first a region that includes no large pores 31 is extracted from the SEM image as indicated by a thick line that encloses a rectangle. Then, this region (hereinafter, referred to as a "region of interest") is subjected image processing using image analysis software. For example, image analysis software "Image-Pro version 9.3.2" manufactured by Nippon Roper K. K. is used.

Figure 7:
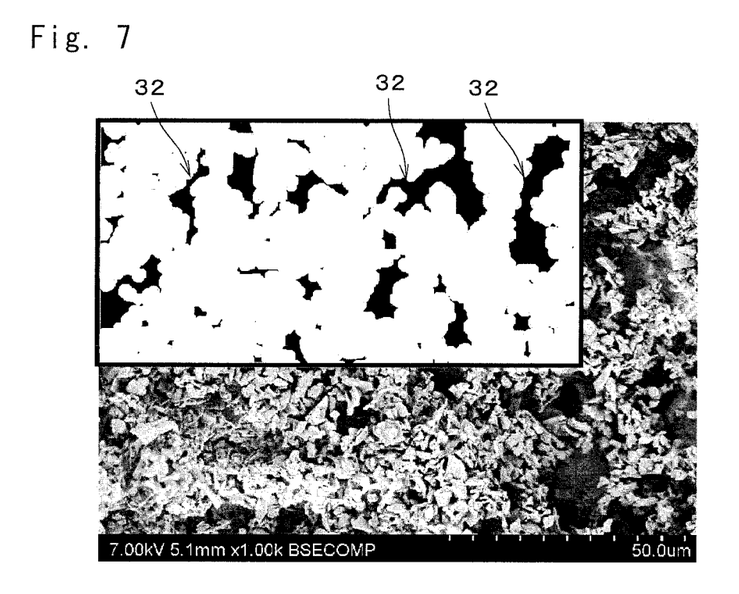
FIG. 7 is an SEM image of the surface of the collection layer after image processing.

The above image processing involves first "Blur 100%" processing under "Process¥2D Filters" and then "Watershed 16 Neighboring" Processing under "Process¥2D Filters¥Morphological." Then, "Dilation with 5×5 Circle" processing under "Process¥2D Filters¥Morphological" is repeated five times. Next, the region of interest is binarized as illustrated in FIG. 7. Thereafter, the number of black regions with sizes falling within a predetermined range is counted in the region of interest in FIG. 7 so as to acquire the number of small pores 32 included in the region of interest.

Figure 8:
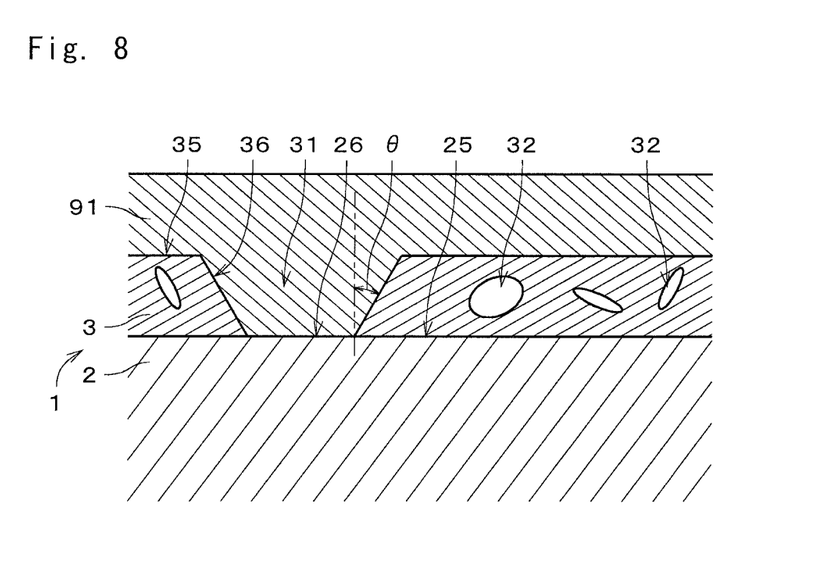
FIG. 8 is a diagram schematically illustrating sections of the collection layer and a base material.

FIG. 8 is a sectional view schematically illustrating sections of the collection layer 3 and the base material 2 of the porous composite 1. Pores of the base material 2 and pores of the collection layer 3 other than the large pores 31 and the small pores 32 are not illustrated in FIG. 8. In FIG. 8, a layer of particulate matter (hereinafter, referred to as a particulate matter layer 91") collected by the collection layer 3 is also illustrated. As illustrated in FIG. 8, the particulate matter layer 91 is in contact with an upper surface 35 of the collection layer 3 (i.e., the surface on the side opposite to the base material 2). The particulate matter layer 91 is also in contact with a side surface 36 of a large pore 31 inside the large pore 31 of the collection layer 3. In FIG. 8, a section of a region is illustrated in which the small pores 32 exist only inside the collection layer 3 and do not exist in the upper surface 35 of the collection layer 3.

The side surface 36 of a large pore 31 is a generally tubular region between the periphery of the large pore 31 in the upper surface 35 of the collection layer 3 and the periphery of an exposed region 26 of the base material 2. In other words, the side surface 36 of a large pore 31 is a generally tubular virtual surface that extends from the periphery of the exposed region 26 in a direction away from the base material 2 along the surface of the collection layer 3. In the example illustrated in FIG. 8, the side surface 36 of a large pore 31 is an inclined surface whose diameter increases as the distance from an interface 25 between the collection layer 3 and the base material 2 increases (i.e., as the distance radially outward from the periphery of the exposed region 26 increases).

The presence of large pores 31 in the collection layer 3 increases an accessible area between the collection layer 3 and the particulate matter layer 91. In the collection layer 3, a rate of increase of this accessible area caused by the large pores 31 is, for example, higher than or equal to 1% and preferably higher than or equal to 4%. This rate of increase is also, for example, lower than or equal to 75% and preferably lower than or equal to 73%.

In each cell 23 with the collection layer 3 formed thereon, the rate of increase of the accessible area caused by a plurality of large pores 31 is obtained by dividing the amount of increase in the accessible area caused by the large pores 31 by the total area of the collection layer 3. The total area of the collection layer 3 in each cell 23 refers to the area of the entire surface of the collection layer 3 in plan view when it is assumed that a plurality of large pores 31 included in the collection layer 3 are filled up. The amount of increase in the accessible area caused by the large pores 31 is obtained by subtracting the area of the upper surface 35 of the collection layer 3, which has been reduced by the presence of the large pores 31, from the areas of the side surfaces 36 of the large pores 31. The areas of the side surfaces 36 of the large pores 31 is calculated based on the assumption that an inclination angle θ of the side surfaces 36 with respect to the normal perpendicular to the interface 25 between the collection layer 3 and the base material 2 is 30 degrees.

Figure 9:
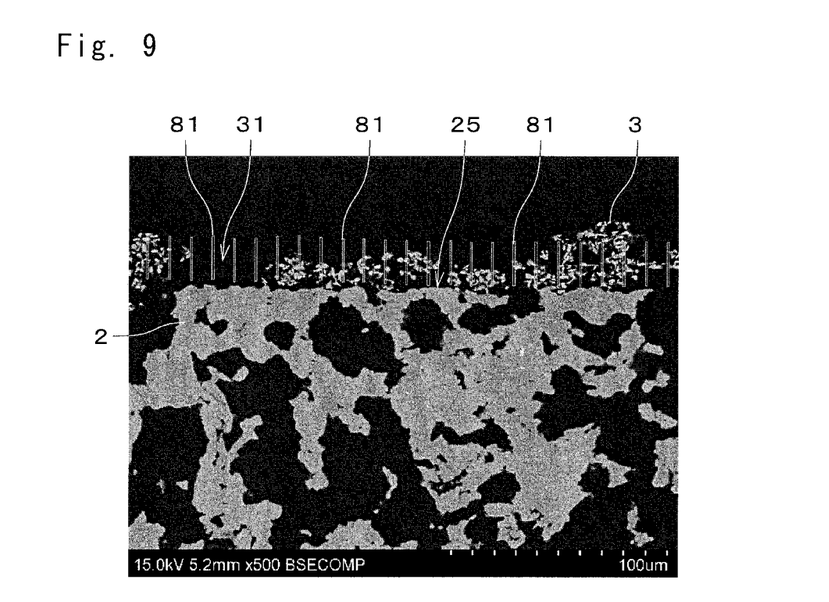
FIG. 9 is an SEM image of sections of the collection layer and the base material.

In the case of confirming the presence of large pores 31 in the collection layer 3, the exposed regions of the base material 2 are not necessarily extracted through visual inspection of an SEM image of the surface of the collection layer 3, and the presence of large pores 31 may be confirmed by other methods. For example, the presence or absence of large pores 31 may be confirmed through image analysis using an SEM image of sections of the collection layer 3 and the base material 2 illustrated in FIG. 9. The SEM image in FIG. 9 is an image magnified 500 times. In FIG. 9, the collection layer 3 is located on the upper side of the base material 2. The image analysis using this image may be implemented by using, for example, the aforementioned image analyze software "Image-Pro ver. 9.3.2."

In the case of confirming the presence or absence of large pores 31 with use of the SEM image in FIG. 9, first a plurality of inspection region 81 are set in a region where the collection layer 3 exists in the SEM image. The inspection regions 81 are arranged at an equal interval in a direction of arrangement along the interface 25 between the collection layer 3 and the base material 2 (i.e., a generally left-right direction in FIG. 9). Each inspection region 81 is a generally rectangular region. The width of each inspection region 81 in the left-right direction is 1 μm, and the length thereof in the up-down direction is 20 μm. The pitch of the inspection regions 81 in the direction of arrangement is 10 μm. The position of the lower end of each inspection region 81 in the up-down direction is approximately the same as the position of the interface 25 between the collection layer 3 and the base material 2 in the up-down direction.

Then, for each inspection region 81, the area of collection-layer particles included in the inspection region 81 (i.e., a sum total area of white pixels included in the inspection region 81 in the binarized image in FIG. 9) is obtained. In the case where the area of collection-layer particles included in the inspection region 81 is 0 μm², there is no collection layer 3 on the base material 2 at a position in which this inspection region 81 is set. In the case where there are two or more consecutive inspection regions 81 in which the area occupied by the collection-layer particles is 0 μm², it is determined that a large pore 31 exposing the base material 2 exists in a region where these two or more inspection regions 81 are set. For example, in the SEM image illustrated in FIG. 9, it is determined that a large pore 31 exists at a position in which the fourth to sixth inspection regions 81 from the left are set.

In the SEM image in FIG. 9, in the case where the area of collection-layer particles included in an inspection region 81 is, for example, greater than 0% of the total area of the inspection region 81 and less than 10% thereof, it may be determined that a small pore 32 exists in the collection layer 3 at a position in which this inspection region 81 is set.

Next, Examples 1 to 7 of the porous composite 1 according to the present invention and a porous composite according to Comparative Example 1 for use in comparison with the porous composite 1 will be described with reference to Tables 1 and 2. In the porous composites 1 of Examples 1 to 3 shown in Table 1, SiC was used as the material for forming the collection layers 3. Similarly, SiC was used as the material for forming the collection layer 3 in the porous composite of Comparative Example 1.

TABLE 1

|  |  | Example 1 | Example 2 | Example 3 | Comparative Example 1 |
|---|---|---|---|---|---|
| Material of Collection Layer | | SiC | SiC | SiC | SiC |
| Thickness | (μm) | 16 | 28 | 30 | 45 |
| Number of Large Pores | | 7 | 5 | 4 | 0 |
| Exposed Region | Diameter Distribution (μm) | 6 to 35 | 6 to 16 | 7 to 15 | — |
| | Average Diameter (μm) | 16.9 | 12.5 | 11.4 | — |
| | Sum Total Perimeter (μm) | 497 | 294 | 181 | — |
| | Sum Total Area (μm²) | 2644 | 852 | 459 | — |
| | Area Ratio | 22% | 7% | 4% | — |
| Accessible Area | μm² | 18549 | 20659 | 17823 | 12048 |
| Rate of Increase of Accessible Area | | 54% | 71% | 48% | 0% |
| Combustion Starting Temperature | (° C.) | 426 | 399 | 439 | 476 |
| Collection Rate | | 80%≤ | 80%≤ | 80%≤ | 80%≤ |

The collection layers 3 of Examples 1 to 3 and the collection layer of Comparative Example 1 have thicknesses of 16 μm, 28 μm, 30 μm, and 45 μm, respectively. These thicknesses were measured by a method using the aforementioned 3D-shape measuring device. The thickness in Table 1 is an average value of thicknesses measured at two positions in each of central (a position of 63 mm from the upper end), upper (a position of 25 mm from the upper end), and lower (a position of 25 mm from the lower end) portions in the longitudinal direction of a porous composite 1 having a length of 120 mm.

The porous composites 1 of Examples 1 to 3 were each produced by the aforementioned production method including steps S11 to S14. In step S11, 1.18 g of a dispersant, 4.73 g of carbon black, 21.17 g of SiC, 14.85 g of graphite, 1.42 g of a flocculating agent, 1.31 g of a polymer flocculating agent, and 525 g of polymer for viscosity adjustment were added to 1564.13 g of water so as to obtain 2100 milliliters (mL) of slurry in total. The above SiC had a mean particle diameter of 2.9 µm. Then, this slurry was sifted through a 250-µm sieve to obtain raw slurry in which agglomerated particles had particle diameters of approximately 13 µm. Thereafter, the raw slurry was supplied to the base material 2 by an amount necessary for achieving the aforementioned thickness so as to form the aforementioned intermediate in step S12. The base material 2 had a mean particle diameter of 12 µm and a porosity of 48%.

In step S13, the intermediate was dried for 12 hours while blowing air at room temperature, and was further dried for 12 hours in a dryer at 80° C. In step S14, firing was conducted at 1200° C. for two hours to form the collection layer 3 on the base material 2. The porous composite of Comparative Example 1 was also formed in the same manner. In the case where there was an insufficient amount of raw slurry for achieving the desired thickness of the collection layer 3, raw slurry was generated at the same ratio as the aforementioned ratio.

In the porous composites 1 of Examples 1 to 3, the collection layers 3 had large pores 31 formed therein. The number of large pores 31 in Table 1 corresponds to the number of large pores 31 included in an image (with the area of field of view of 12048 µm$^2$) of the surface of the collection layer 3 captured and magnified 1000 times by an SEM. Table 1 shows an average value of the numbers of large pores 31 in six SEM images acquired at two positions in each of the aforementioned central, upper, and lower portions in the longitudinal direction of a porous composite 1 having a length of 127 mm. The same applies to Table 2 described later. In the porous composites 1 of Examples 1 to 3, large pores 31 existed in each of the aforementioned central, upper, and lower portions in the longitudinal direction. On the other hand, in the porous composite of Comparative Example 1, the collection layer had no large pores formed therein.

Diameter distributions of the exposed regions 26 in Examples 1 to 3 are distributions in the aforementioned six SEM images. In Example 1, there were exposed regions 26 that were included only in part in the SEM images, so that a maximum value of the diameter distribution of the exposed regions 26 in Example 1 may be larger than the numerical value in Table 1. The average diameter, sum total perimeter, and sum total area of the exposed regions 26 were average values of measured values obtained in the six SEM images. An area ratio of the exposed regions 26 was obtained by dividing the aforementioned sum total area of the exposed regions 26 by the aforementioned total area of the collection layer 3 (i.e., a field of view of 12048 µm$^2$). The accessible areas in Examples 1 to 3 were calculated by the previously-described method on the basis of each characteristic of the exposed regions 26. The rate of increase of the accessible area was obtained by dividing a result obtained by subtracting the field of view of 12048 µm$^2$ of the SEM images from the accessible area by this field of view.

The combustion starting temperatures in Examples 1 to 3 were obtained by the following method. First, 1 g/liters (L) of soot was accumulated on the cells 23 with the collection layer 3 formed thereon in each porous composite 1. Then, the porous composite 1 was cut, and cut-offs (i.e., samples) with soot accumulated thereon were collected and subjected to measurement using a TPD-MS system (heated evolved gas analysis). The TPD-MS system measured a change in the concentration of the gas evolved from the samples that were heated in accordance with a predetermined heating-up program. Then, the base line of a detection peak of carbon monoxide (CO) was set, and a temperature at which carbon monoxide had reached 20% of that area was set as a temperature at which oxidation of the soot had occurred (hereinafter, referred to as a "combustion starting temperature"). The same applies to the combustion starting temperature in Comparative Example 1.

Figure 10:
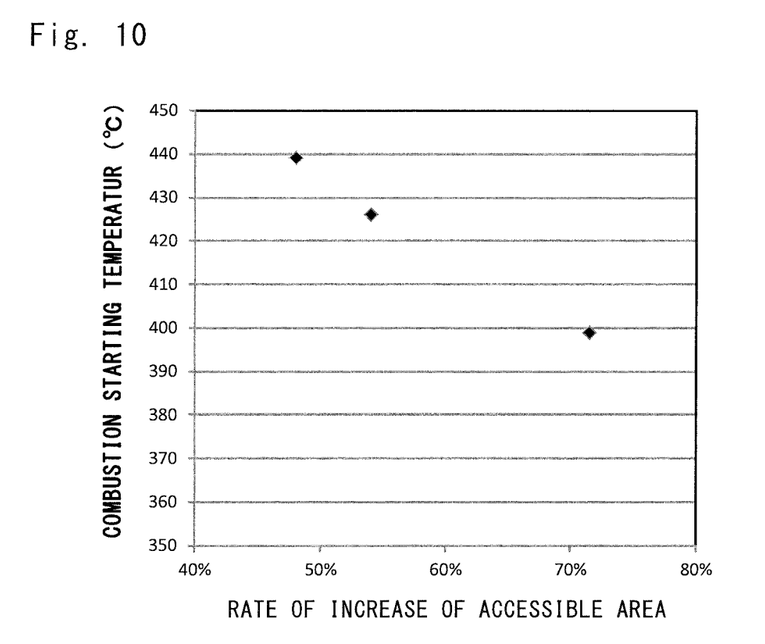
FIG. 10 is a diagram illustrating the relationship between the rate of increase of an accessible area and a combustion starting temperature.

FIG. 10 is an illustration of the relationship between the rate of increase of the accessible area and the combustion starting temperature. As illustrated in FIG. 10, the combustion starting temperature became lower with increasing rate of increase of the accessible area between the collection layer 3 and the particulate matter layer 91. That is, it can be seen that the oxidation of particulate matter by the collection layer 3 was accelerated with increasing accessible area between the collection layer 3 and the particulate matter layer 91.

In the porous composites 1 of Examples 1 to 3, rates of collection of particulate matter in the gas passing through the porous composites 1 were higher than or equal to 80%. Similarly, in the porous composite of Comparative Example 1, a rate of collection of particulate matter in the gas passing through the porous composite was higher than or equal to 80%.

In the porous composite 1 of Example 4 shown in Table 2, SiC was used as the material for forming the collection layer 3. In the porous composites 1 of Examples 5 to 7, $CeO_2$ was used as the material for forming the collection layers 3. The mean particle diameter of $CeO_2$ included in the raw slurry was different among Examples 5 to 7. The collection layers 3 of Examples 4 to 7 had thicknesses of 30 µm, 26 µm, 27 µm, and 29 µm, respectively. These thicknesses were obtained by the same method as that used for obtaining the aforementioned thicknesses in Table 1. The porous composite 1 of Example 4 was produced by the same production method as that used in Examples 1 to 3 described above.

TABLE 2

|  |  | Example 4 | Example 5 | Example 6 | Example 7 |
|---|---|---|---|---|---|
| Material of Collection Layer |  | SiC | $CeO_2$ | $CeO_2$ | $CeO_2$ |
| Mean Particle Diameter | (µm) | 2.9 | 0.6 | 3.7 | 5.1 |
| Thickness | (µm) | 30 | 26 | 27 | 29 |
| Number of Large Pores |  | 4 | 5 | 4 | 4 |
| Exposed Region  Diameter Distribution | (µm) | 7 to 15 | 11 to 21 | 17 to 46 | 10 to 40 |

TABLE 2-continued

|  |  | Example 4 | Example 5 | Example 6 | Example 7 |
|---|---|---|---|---|---|
| Average Diameter | (μm) | 11.4 | 14.8 | 30.3 | 25.5 |
| Sum Total Perimeter | (μm) | 181 | 208 | 341 | 200 |
| Sum Total Area | (μm$^2$) | 459 | 613 | 1843 | 1647 |
| Area Ratio |  | 4% | 5% | 15% | 14% |
| Accessible Area | (μm$^2$) | 17823 | 17653 | 20788 | 17068 |
| Rate of Increase of Accessible Area |  | 48% | 47% | 73% | 42% |
| Combustion Starting Temperature | (° C.) | 439 | 455 | 469 | 468 |
| Rate of Collection |  | 85% | 71% | 80% | 73% |

The porous composites 1 of Examples 5 to 7 were also each produced by the aforementioned production method including steps S11 to S14. In step S11, 1.18 g of a dispersant, 4.73 g of carbon black, 50.61 g of CeO$_2$, 14.85 g of graphite, 1.42 g of a flocculating agent, 1.31 g of a polymer flocculating agent, and 525 g of polymer for viscosity adjustment were added to 1564.13 g of water so as to obtain 2100 mL of slurry in total. Then, this slurry was sifted through a 250-μm sieve to obtain raw slurry in which agglomerated particles had particle diameters of approximately 13 μm. Thereafter, in step S12, the raw slurry was supplied to the base material 2 by an amount necessary for achieving the aforementioned thickness so as to form the aforementioned intermediate.

In step S13, this intermediate was dried for 22 hours while blowing air at room temperature, and was further dried for 24 hours in a dryer at 80° C. In step S14, firing was conducted at 1200° C. for two hours to form the collection layer 3 on the base material 2. In the case where there was an insufficient amount of raw slurry for achieving the desired thickness of the collection layer 3, raw slurry was generated at the same ratio as the aforementioned ratio.

In the porous composites 1 of Examples 4 to 7, the collection layers 3 had large pores 31 formed therein. The numbers of large pores 31 in Examples 4 to 7 were four or five. The method of obtaining the number of large pores 31 was similar to that in Examples 1 to 3. Examples 4 to 7 show that large pores 31 can also be formed in the collection layers 3 formed of a material other than SiC. Moreover, even if the mean particle diameter of CeO$_2$ in the raw slurry varies, there is little influence on the number of large pores 31 to be formed.

As described above, the porous composite 1 includes the porous base material 2 and the porous collection layer 3 formed on the base material 2. The collection layer 3 has a thickness greater than or equal to 6 μm. The collection layer 3 has a plurality of large pores 31, each exposing the surface of the base material 2. A sum of the areas of the exposed regions 26 of the base material 2 that are each exposed from each large pore 31 of the plurality of large pores 31 is greater than or equal to 1% of the total area of the collection layer 3 and less than or equal to 50% thereof. This allows the porous composite 1 to achieve a favorable efficiency of collecting particulate matter and to increase the accessible area between the particulate matter and the collection layer 3. As a result, it is possible to accelerate the oxidation of particulate matter collected by the porous composite 1 and to lower the combustion starting temperature of the particulate matter.

As described above, the exposed regions 26 of the base material 2 exposed from each large pore 31 preferably have perimeters greater than or equal to 18 μm and less than or equal to 500 μm. This allows the porous composite 1 to maintain a favorable collection efficiency, unlike in the case where the collection layer 3 has excessively large pores (e.g., pores formed by delamination at the time of forming the collection layer 3). It is also possible to prevent an excessive decrease in the accessible area caused by the exposed regions 26 and to efficiently increase the accessible area between the particulate matter and the collection layer 3.

In the porous composite 1, the rate of increase of the accessible area between the collection layer 3 and the particulate matter caused by a plurality of large pores 31 is preferably higher than or quall to 1% and lower than or equal to 75%. By making the rate of increase higher than or equal to 1%, it is possible to favorably accelerate the oxidation of particulate matter collected by the porous composite 1. By making the rate of increase less than or equal to 75%, it is possible to suppress a decrease in the collection efficiency of the porous composite 1 due to an increase in the number of large pores 31 and to allow the porous composite 1 to maintain a favorable collection efficiency.

As described above, among a plurality of enlarged images of the surface of the collection layer 3 captured at a plurality of arbitrary positions on the collection layer 3 and magnified 1000 times by an SEM, 90% or more enlarged images preferably include some of the large pores 31. This allows the porous composite 1 to achieve both of maintaining the collection efficiency and increasing the accessible area between the particulate matter and the collection layer 3. More preferably, the number of large pores 31 included in each of the 90% or more enlarged images is greater than or equal to one and less than or equal to eight. This allows the porous composite 1 to more favorably achieve both of maintaining the collection efficiency and increasing the accessible area between the particulate matter and the collection layer 3.

In the porous composite 1, the collection layer 3 preferably has pores with diameters greater than or equal to 3 μm and less than or equal to 20 μm (i.e., small pores 32) in a region other than the plurality of large pores 31. This suppresses pressure loss caused by the collection layer 3 even in a region where large pores 31 do not exist. The presence of the small pores 32 and the large pores 31 in the collection layer 3 allows the porous composite 1 to simultaneously achieve all of achieving a favorable efficiency of collecting particulate matter, increasing the accessible area between the particulate matter and the collection layer 3, and suppressing pressure loss caused by the collection layer 3.

In the aforementioned porous composite 1, the base material 2 preferably has a honeycomb structure whose inside is partitioned into a plurality of cells 23 by the partition wall 22 and in which at least some of the cells 23 have inner surfaces covered with the collection layer 3. The porous composite 1 with this structure can achieve both of favorably collecting particulate matter and suppressing pressure loss. As described above, the porous composite 1 can achieve a favorable efficiency of collecting particulate matter and can also increase the accessible area between the particulate matter and the collection layer 3 and lower the combustion starting temperature of the particulate matter. Accordingly, the porous composite 1 is in particular suitable for use as a GPF for collecting particulate matter in an exhaust gas emitted from a gasoline engine.

In order for the porous composite 1 to achieve both of achieving a favorable efficiency of collecting particulate matter and increasing the accessible area between the particulate matter and the collection layer 3, the porous composite 1 does not necessarily have to include such a collection layer 3 that has large pores 31 detected in the aforementioned SEM images. For example, similar effects can also be achieved with such a porous composite 1 that includes a collection layer 3 having the following features.

These features are as follows. The collection layer 3 has a thickness greater than or equal to 6 μm. In a photograph of sections of the collection layer 3 and the base material 2 captured and magnified 500 times by an SEM, a plurality of straight lines perpendicular to the interface 25 between the collection layer 3 and the base material 2 are arranged at an equal interval along this interface, and a value obtained by dividing the number of a plurality of overlapping straight lines that overlap with pixels indicating the collection layer 3 by the total number of the plurality of straight lines is greater than or equal to 50% and less than or equal to 90%. This allows the porous composite 1 to achieve a favorable efficiency of collecting particulate matter and to increase the accessible area between the particulate matter and the collection layer 3 in the same manner as described above. As a result, it is possible to accelerate the oxidation of particulate matter collected by the porous composite 1 and to lower the combustion starting temperature of the particulate matter.

Specifically, in an SEM image similar to that in FIG. 9, a plurality of inspection regions 81 are replaced by straight lines each having a length of the same order as the length of the inspection regions 81 in the up-down direction, and these straight lines are arranged at a smaller pitch and in a larger number than the inspection regions 81 in the direction of arrangement (i.e., a generally left-right direction in FIG. 9) along the interface 25. Since the collection layer 3 exists on the aforementioned overlapping straight lines, it is possible to achieve a favorable efficiency of collecting particulate matter. Moreover, it can be thought that a substance constituting the collection layer 3 does not exist on the straight lines excluding the overlapping straight lines. Therefore, the surface of the collection layer 3 that extends in the up-down direction comes in contact with the particulate matter, which increases the accessible area between the particulate matter and the collection layer 3.

In this case, a value obtained by dividing the number of overlapping straight lines that overlap with pixels indicating the collection layer 3 by an amount less than or equal to 10% of the thickness of the collection layer 3, among the plurality of overlapping straight lines, by the total number of the aforementioned straight lines is preferably greater than or equal to 30%. This allows the porous composite 1 to simultaneously achieve all of achieving a favorable efficiency of collecting particulate matter, increasing the accessible area between the particulate matter and the collection layer 3, and suppressing pressure loss caused by the collection layer 3, in the same manner as in the case where the collection layer 3 has large pores 31 and small pores 32.

The aforementioned porous composite 1 may be modified in various ways.

The number of large pores 31 and the probability of the presence of large pores 31 in an SEM image of the surface of the collection layer 3, the perimeters and sizes of the exposed regions 26, and other features are not limited to the ranges described above, and may be changed in various ways. The rate of increase of the accessible area between the collection layer 3 and the particulate matter layer 91 is also not limited to the range described above, and may be changed in various ways.

The structure of the porous composite 1 may be modified in various ways. For example, the mesh sealing parts 24 may be omitted from the base material 2. All of the cells 23 may have inner surfaces provided with the collection layer 3. Furthermore, the base material 2 does not necessarily have to have a honeycomb structure, and may have any other shape whose inside is not partitioned by a partition wall, such as a simple tubular shape or a simple flat plate shape.

The applications of the porous composite 1 are not limited to the aforementioned GPF, and the porous composite 1 may be used as any other filter such as a diesel particulate filter (DPF). As another alternative, the porous composite 1 may be used in applications other than filters.

Figure 4:
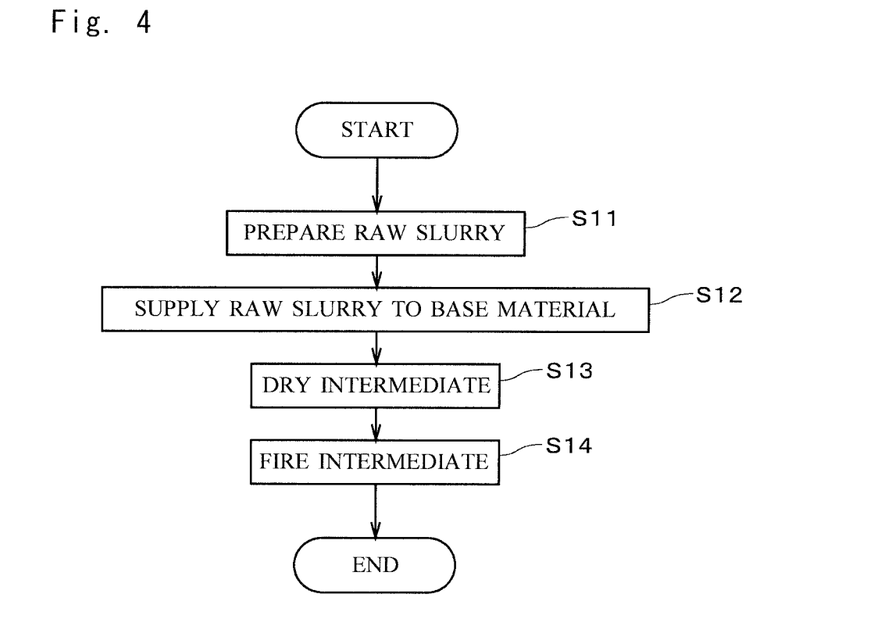
FIG. 4 is a flowchart of production of the porous composite.

The method of producing the porous composite 1 is not limited to the method illustrated in FIG. 4, and may be modified in various ways. For example, in step S12, the method of supplying the raw slurry to the base material 2 may be modified in various ways. The supply of the raw material for the collection layer 3 to the base material 2 is not limited to be implemented by a filtering system using raw slurry, and may be implemented by any of various methods such as dipping, spraying, and drying. The drying method and drying time of the intermediate in step S13 and the firing temperature and firing time of the intermediate in step S14 may also be changed in various ways.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The present invention is applicable to filters for collecting particulate matter such as a gasoline particulate filter for collecting particulate matter in an exhaust gas emitted from a gasoline engine.

REFERENCE SIGNS LIST

1 Porous composite
2 Base material
3 Collection layer
22 Partition wall
23 Cell
25 Interface
26 Exposed region
31 Large pore
32 Small pore
S11 to S14 Step

The invention claimed is:

1. A porous composite comprising:
a porous base material; and
a porous collection layer formed on said porous base material,
wherein said porous collection layer has a thickness greater than or equal to 6 μm,
wherein said porous collection layer has:
a plurality of large pores, each with a diameter of greater than or equal to 6 μm and less than or equal to 50 μm, each exposing a surface of said porous base material;
a plurality of small pores, each with a diameter of greater than or equal to 3 μm and less than or equal to 20 μm, each not exposing the surface of said porous base material, provided in a region other than said plurality of large pores, wherein
among a plurality of enlarged images of a surface of said porous collection layer that are captured at a plurality of arbitrary positions on said porous collection layer and magnified 1000 times by a scanning electron microscope, 90% or more enlarged images include some of said plurality of large pores, and
a sum of areas of exposed regions of said porous base material that are each exposed through each large pore of said plurality of large pores is greater than or equal to 1% of a total area of said porous collection layer and less than or equal to 50% of the total area of said porous collection layer.

2. The porous composite according to claim 1, wherein said exposed regions of said porous base material, each exposed through said each large pore of said plurality of large pores, have perimeters greater than or equal to 18 μm and less than or equal to 500 μm.

3. The porous composite according to claim 1, wherein a rate of increase of an accessible area between said porous collection layer and particulate matter caused by said plurality of large pores is higher than or equal to 1% and lower than or equal to 75%.

4. The porous composite according to claim 1, wherein a number of large pores included in each of said 90% or more enlarged images is greater than or equal to one and less than or equal to eight.

5. The porous composite according to claim 1, wherein said porous base material has a honeycomb structure, an inside of the honeycomb structure is partitioned into a plurality of cells by partition walls, and
at least some of said plurality of cells have inner surfaces covered with said porous collection layer.

6. The porous composite according to claim 5, being a gasoline particulate filter that collects particulate matter in an exhaust gas emitted from a gasoline engine.

7. A porous composite comprising:
a porous base material; and
a porous collection layer formed on said base material,
wherein said collection layer has a thickness greater than or equal to 6 μm,
wherein said collection layer has:
a plurality of large pores, each with a diameter of greater than or equal to 6 μm and less than or equal to 50 μm, each exposing a surface of said base material;
a plurality of small pores, each with a diameter of greater than or equal to 3 μm and less than or equal to 20 μm, each not exposing the surface of said base material, provided in a region other than said plurality of large pores, wherein
among a plurality of enlarged images of a surface of said collection layer that are captured at a plurality of arbitrary positions on said collection layer and magnified 1000 times by a scanning electron microscope, 90% or more enlarged images include some of said plurality of large pores, and
a sum of areas of exposed regions of said base material that are each exposed through each large pore of said plurality of large pores is greater than or equal to 1% of a total area of said collection layer and less than or equal to 50% of the total area of said collection layer, and
in a photograph of sections of said collection layer and said base material captured and magnified 500 times by a scanning electron microscope, a plurality of straight lines perpendicular to an interface between said collection layer and said base material are arranged at an equal interval along said interface, and a value obtained by dividing a number of a plurality of overlapping straight lines that overlap with pixels indicating said collection layer by a total number of said plurality of straight lines is greater than or equal to 50% and less than or equal to 90%.

8. The porous composite according to claim 7, wherein a value obtained by dividing the number of overlapping straight lines that overlap with pixels indicating said collection layer by an amount less than or equal to 10% of the thickness of said collection layer, among said plurality of overlapping straight lines, by the total number of said plurality of straight lines is greater than or equal to 30%.

9. The porous composite according to claim 7, wherein said base material has a honeycomb structure, an inside of the honeycomb structure is partitioned into a plurality of cells by partition walls, and
at least some of said plurality of cells have inner surfaces covered with said collection layer.

10. The porous composite according to claim 9, being a gasoline particulate filter that collects particulate matter in an exhaust gas emitted from a gasoline engine.

* * * * *